Nov. 19, 1968   H. S. MYERS, JR   3,411,163
SWIMMING POOL HEATER
Filed Jan. 21, 1966

INVENTOR.
HENRY S. MYERS Jr.
BY
Christie, Parker & Hale
ATTORNEYS

3,411,163
SWIMMING POOL HEATER
Henry S. Myers, Jr., 3695 Denair,
Pasadena, Calif. 91107
Filed Jan. 21, 1966, Ser. No. 522,172
8 Claims. (Cl. 4—172)

This invention relates to solar heaters for swimming pools.

Many attempts have been made to heat swimming pools with solar radiation, with varying degrees of success.

A typical solar heater for swimming pools utilizes a number of tubes or ducts normally attached to some type of extended surfaces or fins to form a solar panel. Normally, the solar panel is mounted on a roof, either horizontally or slightly inclined toward the sun. Water from the pool is circulated through the ducts in the solar panel and then returned to the pool.

Several problems have held back the acceptance of solar swimming pool heaters. First, most units have been somewhat unsightly. With many roof designs, it is not possible to hide the unit from view conveniently. In addition, solar heaters of a reasonable size do not have enough capacity to maintain a comfortable water temperature unless the pool is covered at night and in bad weather. Most pool owners do not want to bother with a manual cover, and automatic pool covers have been cumbersome, unsightly, and expensive.

The location of the solar panel some distance from the pool has the disadvantage of adding pressure drop to the circulating system. Moreover, such panels are normally allowed to become relatively hot with the thought that water circulating through them will be hotter and thus warm the pool more when it is returned. This type of heater is inefficient because the high temperature of the panel causes a considerable portion of the solar heat to be lost by radiation and convection to the sky and the surrounding air instead of being absorbed by the water in the pool.

This invention provides a swimming pool solar heater with improved efficiency and appearance.

The heater of this invention uses the swimming pool cover itself as the absorber of solar radiation. For maximum efficiency, the top surface of the cover is black. Water in the pool is circulated against the bottom of the cover to extract heat from it and reduce the temperature of the cover to decrease the loss of heat from the cover.

In one form of the invention, the cover is placed on the pool in contact with the water surface and water in the pool is circulated against the bottom side of the cover. The conventional circulating equipment can be used for this purpose. However, it is preferable to add a perforated distributor hose or conduit near the top of the pool. Water is taken from a lower portion of the pool and circulated through the distributor and the perforations to agitate the layer of water in contact with the bottom of the cover over a substantial surface area. This agitation enhances the heat transfer from the cover to the pool water and keeps the cover relatively cool to minimize the loss of heat from its upper surface.

In the presently-preferred embodiment of the heater, the cover is spaced above the pool and a plurality of nozzles direct a spray of water against the bottom of the cover over a wide area. The water strikes the bottom of the cover, is warmed, and falls into the pool. A pump circulates cooler water from a lower portion of the pool back to the nozzles for contact with the warmer bottom of the pool cover. During the hours of darkness, the water is not circulated against the bottom of the cover to minimize heat transfer from the pool to the cover, which tends to radiate heat to the sky. The advantage of having the cover spaced above the water surface is that it reduces transfer of heat from the water to the cover during the hours of darkness.

The efficiency of the heater of this invention is relatively high because it is operated at a low temperature level to reduce heat loss by radiation and convection. The cover further minimizes heat loss by preventing evaporation of water from the pool.

These and other aspects of the invention will be more fully understood from the following detailed description and the accompanying drawings, in which.

Figure 1:
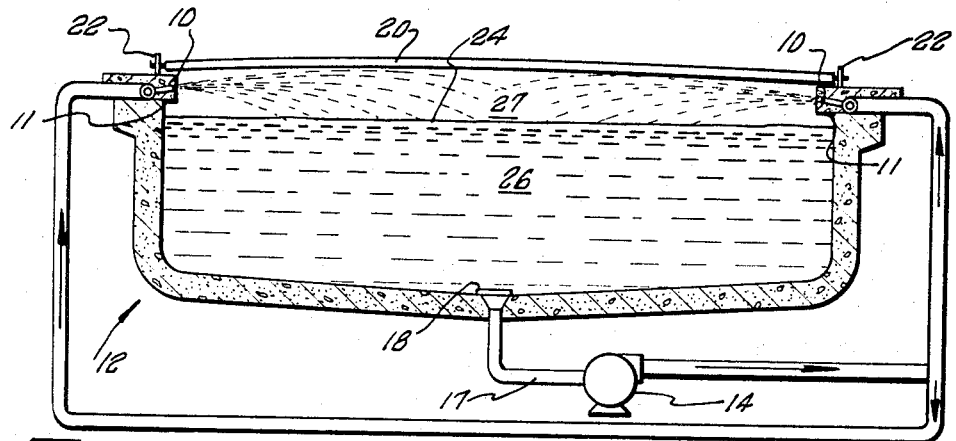
FIG. 1 is a schematic sectional elevation of the presently-preferred embodiment of the heater mounted on a swimming pool.

Referring to FIG. 1, a plurality of nozzles 10 mounted along the sides 11 of a swimming pool 12 receive water from a manifold 14 connected to the discharge 15 of a circulating pump 16. The pump can be of the conventional type normally used with swimming pools, and its suction or inlet 17 is connected to the drain 18 of the swimming pool. The filtering system for the water is normally included at the pump discharge but is not shown because it forms no part of this invention. For certain types of covers, such as hinged rather than rolling designs, or for installations on existing pools, it may be preferable to mount the nozzles integral with the cover rather than in the deck. A swivel or removable connection or a flexible hose to the pump discharge line would then be required.

Each of the nozzles opens toward the center of the pool to direct a spray of water against the bottom of a cover 20 disposed over the pool and supported on rollers 22 adapted to ride along the sides of the pool so the cover can be easily removed when desired. The mechanical means of removing the cover is not important to the invention. Rollers are merely one technique.

As shown best in FIG. 1, the cover is disposed above the surface 24 of a pool of water 26 to leave an air space 27 between the water and the bottom of the cover.

Figure 2:
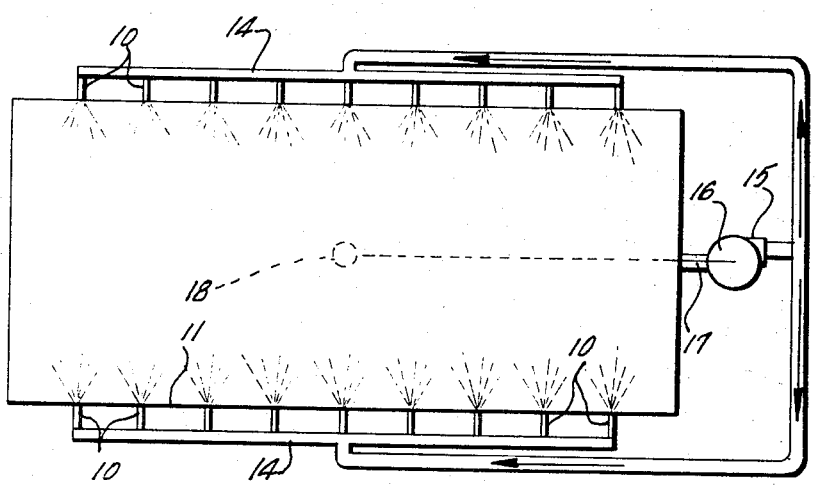
FIG. 2 is a plan view of the heater shown in FIG. 1.

In operating the solar heater shown in FIGS. 1 and 2, the cover is rolled into position over the pool surface, and the circulating pump is turned on to direct a spray of water from the nozzles against the bottom of the cover. Radiation from the sun tends to heat the cover. However, the spray of water directed against the bottom of the cover removes heat almost as fast as it is received from the sun. Consequently, the temperature of the cover is only slightly above that of the water, and, therefore, there is a minimum amount of heat radiated by the cover toward the sky. When the sun is not shining on the cover, the circulating pump is turned off or flow is by-passed around the nozzles and through the normal return line so that no water is sprayed against the bottom side of the cover. The air space between the cover and the surface of the pool acts as an insulator to minimize the heat transfer from the pool to the cover which tends to radiate heat away from the pool. If desired, the bottom surface of the cover is silvered so that it reflects heat from the pool and minimizes heat loss. The cover further decreases heat loss by reducing evaporation of water from the pool.

Figure 3:
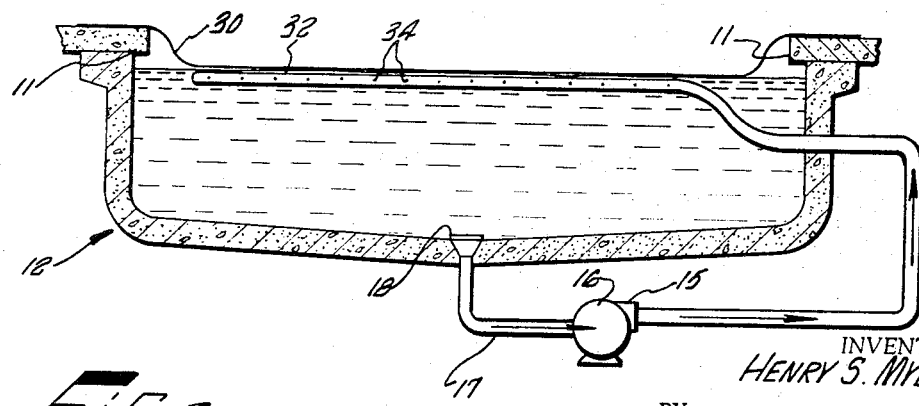
FIG. 3 is a schematic sectional elevation of an alternate embodiment of the heater in which the cover is in direct contact with the surface of the water in the pool.

In the arrangement shown in FIG. 3, a cover 30, which may be a thin plastic sheet, is supported at its edges on the sides 11 of the swimming pool 12 and rests on a buoyant distributor hose 32 floating on the surface of the water and connected at one end to the outlet 15 of the circulating pump 16. A plurality of holes 34 along the buoyant hose distribute streams of water over the surface of the pool and agitate the water in contact with the underside of the cover 30. With the heater shown in FIG. 3, water is circulated from the drain, through the circulating pump, into the buoyant hose, out the holes 34, and against the bottom of the cover to remove heat from the cover almost as fast as it is received from the sun. At night, the circulation of water is stopped to minimize heat loss due to radiation from the cover toward the sky. The disadvantage of the apparatus shown in FIG. 3 is that the cover is in direct contact with the water so that there is better heat transfer at night and, consequently, more heat is lost than with the arrangement shown in FIGS. 1 and 2. However, even with an apparatus similar to that shown in FIG. 3, I have found that a normal size residential swimming pool can gain about 100,000 B.t.u.'s per hour on a typical sunny day during the fall in Southern California. A heater of the type shown in FIG. 3 raised the temperature of an unheated pool from the range of 58–63° F. to 77–82° F., or an average temperature increase of about 19° F.

I claim:

1. Apparatus for solar heating a swimming pool, the apparatus comprising a cover disposed over the pool to absorb solar radiation, and mechanical pump means for circulating water in the pool against the bottom of the cover to extract heat from it and reduce the temperature of the cover to decrease the loss of heat from the cover and returning heated water to the pool.

2. Apparatus according to claim 1 which includes means for withdrawing water from a lower portion of the pool and circulating it against the bottom of the cover.

3. Apparatus according to claim 1 in which the cover is disposed above the surface of the water in the pool to leave an air space between the bottom of the cover and the surface of the water.

4. Apparatus according to claim 1 in which the cover is removable.

5. Apparatus according to claim 1 which includes nozzles mounted around the pool to spray water against the underside of the cover.

6. Apparatus according to claim 1 in which the bottom of the cover rests in contact with the surface of the water in the pool.

7. Apparatus according to claim 6 which includes a distributor conduit near the surface of the water in the pool and arranged to circulate water in the vicinity of the bottom of the cover.

8. Apparatus according to claim 7 in which the distributor conduit is buoyant.

References Cited

UNITED STATES PATENTS

| | | | |
|---|---|---|---|
| 2,088,410 | 7/1937 | Everson | 4—172 |
| 2,580,555 | 1/1952 | Kroeger | 4—172 |
| 3,022,781 | 2/1962 | Andrassy | 4—172 |
| 3,072,920 | 1/1963 | Yellott | 4—172 |
| 3,077,190 | 2/1963 | Allen | 4—172 |
| 3,146,774 | 9/1964 | Yellott | 4—172 |
| 3,239,000 | 3/1966 | Meagher | 126—271 |
| 3,314,415 | 4/1967 | Rowekamp | 126—271 |
| 3,321,012 | 5/1967 | Hervey | 126—271 |

FOREIGN PATENTS

| | | |
|---|---|---|
| 16,917 | 3/1934 | Australia. |

OTHER REFERENCES

"A Solar-Heated Swimming Pool," from Heating, Air Conditioning, Ventilation and Insulation," vol. 21, No. 164, August 1959, pp. 231–236, publish. in London.

"Solar Heating for a Small Swimming Pool," from Heating, October 1961, vol. 23, No. 190, pp. 339–343.

LAVERNE D. GEIGER, *Primary Examiner.*

H. K. ARTIS, *Assistant Examiner.*